United States Patent [19]

McGuire et al.

[11] 4,231,188
[45] Nov. 4, 1980

[54] METHOD AND SYSTEM FOR PROPAGATING OF PLANTS

[76] Inventors: John J. McGuire, 37 Earles Court Rd., Narragansett, R.I. 02882; Edward J. Auger, 1301 Bald Hill Rd., Warwick, R.I. 02886

[21] Appl. No.: 972,812

[22] Filed: Dec. 26, 1978

[51] Int. Cl.³ .............................................. A01G 27/00
[52] U.S. Cl. ............................................. 47/80; 47/59
[58] Field of Search ......................................... 47/79–82, 47/59, 62–65

[56] References Cited

U.S. PATENT DOCUMENTS

| | | | |
|---|---|---|---|
| 1,221,449 | 4/1917 | Hitchcock | 47/80 |
| 3,778,928 | 12/1973 | Green | 47/80 |
| 4,001,968 | 1/1977 | Green | 47/80 |

FOREIGN PATENT DOCUMENTS

| | | | |
|---|---|---|---|
| 2158366 | 3/1973 | Fed. Rep. of Germany | 47/80 |
| 15061 | of 1901 | United Kingdom | 47/81 |

*Primary Examiner*—Robert E. Bagwill
*Attorney, Agent, or Firm*—Thompson, Birch, Gauthier & Samuels

[57] ABSTRACT

A plant growing system is provided wherein a layer of sand is placed between two water-impermeable layers. The top impermeable layer covers the entire sand surface and is formed of a thin opaque plastic. Each container for a plant has prongs extending from the bottom which, when positioned on the top sheet, extends into the sand layer without contacting the bottom water-impermeable layer. Water and nutrients are metered into the sand layer which is transmitted into the containers by capillary action.

10 Claims, 5 Drawing Figures

METHOD AND SYSTEM FOR PROPAGATING OF PLANTS

BACKGROUND OF THE INVENTION

This invention relates to a method and system for propagating growing plants and seeds by maintaining a supply of plant nutrients and water to the plants or seeds. More particularly, this invention relates to a method for propagating the growth of plants or seeds while preventing formation of algae and while minimizing evaporation of water.

Conventional plant propagators utilize a flat bed or storage trays which may be waterproof or may comprise a perforated tank. The tanks are provided with delivery pipes fitted with nozzles for delivering the nutrients. The delivery pipes of the individual tanks may be isolated from the entire supply system through control and stopcocks. Tanks equipped in this way are filled with a sand layer whose surface is leveled. By opening the stopcocks, the tanks are filled until the sandbeds are saturated with water but without the water level rising above the sand layer surface. The plants or seeds are supplied with the moisture either directly or through holes provided in the bottoms of pots or other vessels. The use of container plant production of crops is of increasing importance due to rising land values and labor cost for producing field-grown stock. Container plant production offers advantages over fieldgrown stock including: extended sales in planting seasons, development of attractive sales packages, greater transportability, beter control of environmental and cultural factors and more efficient use of labor, production and sales areas.

Growing plants in containers, however, presents special problems of watering and fertilizing not experienced in field production. Frequent excess overhead irrigation, besides being inefficient, can cause severe leaching of nutrients from the containers. This frequently results in pollution of nearby streams caused by the excess run-off from the plant growing areas.

The use of a sand layer, also, is disadvantageous since the sand surface becomes covered with algae far too quickly. This results in a reduction in the transmission of water or nutrient liquid into the plant containers until finally the supply is stopped altogether. Although the algae can be destroyed by conventional chemical preparations, it has been shown that the development of plants is adversely affected by such preparations. In addition, considerable expense is involved with such preparations.

It has been proposed in U.S. Pat. No. 4,001,968 to utilize a plant growing system where water is supplied to a layer of sand, positioned between two layers of plastic sheet wherein the top layer is perforated with a multiplicity of small holes through which water moves by capillary action. A container housing soil and a plant and having a perforated bottom is placed upon the perforated plastic sheet so that water passing through the holes in the sheet supplies the plant with water and nutrients. While this system substantially reduces the amount of water loss by way of evaporation, its use is undesirable since the small holes in the top plastic sheet expose the wet sand to light and air thereby promoting undesirable algae formation.

It would be highly desirable to provide a system for growing plants which minimizes water loss since water is expensive and in many cases only limitedly available. In addition, it would be highly desirable to provide such a plant growing system which eliminated excess water run-off, thereby preventing pollution of the surrounding environment. In addition, it would be desirable to provide such a system which eliminates undesirable algae growth.

SUMMARY OF THE INVENTION

This invention provides an irrigation system for plants housed in individual containers which delivers water and water soluble nutrients by capillary action. Water is supplied to a layer of water-transmitting particles such as sand, which layer is positioned between two plastic sheets formed of a flexible, light-opaque and moisture-impermeable material such as polyethylene. The plant to which water and nutrients are to be supplied is housed in a container, the bottom surface of which is provided with hollow prongs adapted to pierce the top of the plastic sheet and to extend within the water-transmitting layer, thereby to establish a water-transmitting path by which the water can be transmitted to the soil within the container by capillary action. In one aspect of this invention, the prongs are tapered so that the containers can be stored in a nesting relationship.

DETAILED DESCRIPTION OF SPECIFIC EMBODIMENTS

Figure 1:
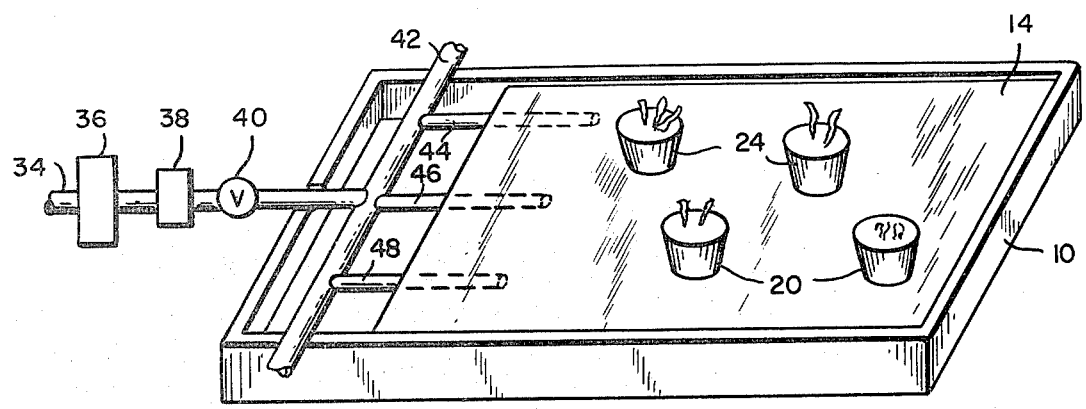
FIG. 1 is a perspective view of the system of this invention.
Figures 2, 2A:
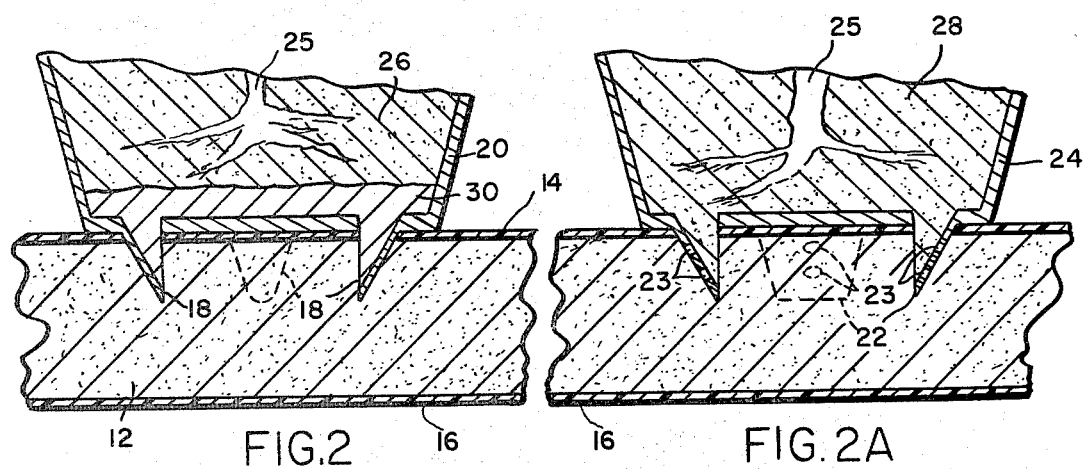
FIG. 2 is a cross-sectional side view of a plant container used in this invention.
FIG. 2A is a cross-sectional side view of an alternative plant container used in this invention.
Figures 3, 4:
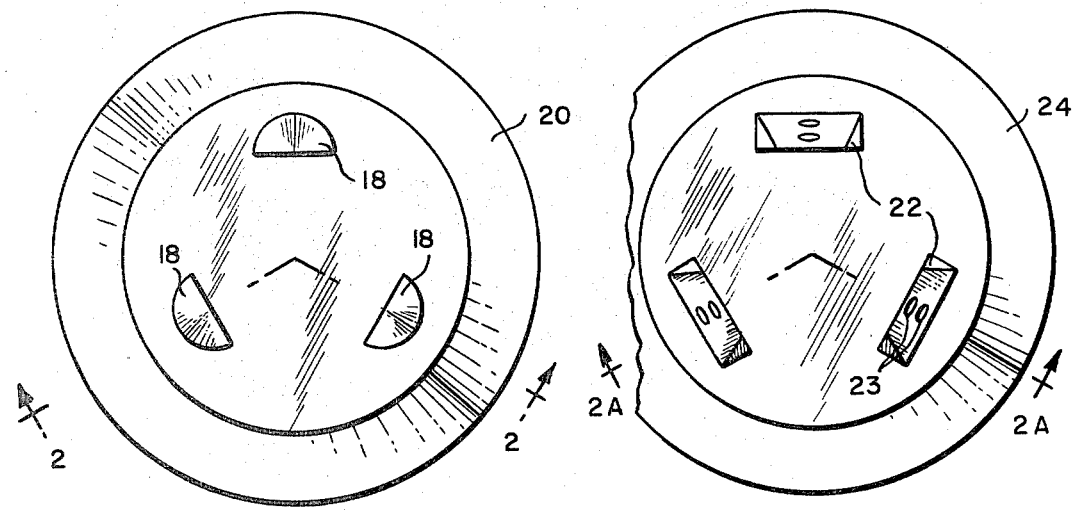
FIG. 3 is a bottom view of the container of FIG. 2.
FIG. 4 is a bottom view of the container of FIG. 2A.

In accordance with this invention, water, either alone or containing plant nutrients, is supplied to a water-transmitting layer of particles adapted to permit passage of water therethrough by capillary action. It is desirable to minimize the thickness of the layer of particles in order to minimize the amount of water required for transmittal of proper amounts of water to each plant. Accordingly, the layer of water-transmitting particles is generally between about ½ and about 3 inches, preferably between about ½ and about 1 inch. The layer of water-transmitting particles is sandwiched between two opaque, water-impermeable, thin plastic sheets which function to prevent or minimize evaporation from the particles and to direct the water in the particles to plants housed in containers positioned above the layer of water-transmitting particles.

The desired transmission of water to the plants is accomplished by utilizing containers for the plants that are provided with prongs that are adapted to pierce the top layer of plastic sheet and to extend within the layer of water-transmitting particles without piercing the bottom of the plastic sheet. The prongs either contain soil from the container or the particles comprising the water-transmitting layer, which particles are present in the prongs by virtue of pressing the prongs through the top of the plastic layer into the particles. By utilizing a continuous opaque plastic sheet not having holes therein, certain advantages are obtained in accordance with this invention. Thus, prior art techniques prevent evaporation from the top layer of water-transmitting particles by positioning discrete plastic strips in a geometry to leave openings approximating the bottom surface of the container for plants. In these techniques, it is generally not possible to accurately form the openings to conform precisely with the bottom surface geometry of the container. Thus, at least a portion of the top surface of the water-transmitting particles will be exposed to the atmosphere, thereby promoting growth of algae and undesired evaporation of water from the particles. In another prior art technique, small discrete holes are formed in the top plastic layer by puncturing that layer. In this technique, the top surface of the water-transmitting particles is exposed directly to the atmosphere which promotes the growth of undesired algae and which promotes undesirable evaporation. In addition, this technique provides a space between the water-transmitting particles and the soil within the container which is defined by the height of the holes within the plastic layer. This space serves to reduce transmittal of water to the container since it does not contain particles which promote water-transmission by capillary action. Thus, by utilizing a container having prongs in accordance with this invention, no water-transmitting particles are undesirably exposed directly to the atmosphere, thereby preventing growth of algae and undesired evaporation into the atmosphere, while at the same time providing a continuous path of solid particles between the source of water and the soil within the container so that water-transmission through capillary action is not reduced.

The plastic opaque sheet material can be any conventional plastic material such as polyethylene, polyvinyl chloride, saran or the like so long as it is sufficiently thick to prevent water-transmittal therethrough while being sufficiently thin to permit the prongs of the plant container to extend therethrough into the water-transmitting particles. Generally, such sheets have a thickness of between about 1.5 mils and 6 mils. Generally, opacity is obtained when the sheets are dark green and/or black. The water-transmitting particles can be formed from any hydrophilic material which is non-toxic for plants. Suitable materials include silica sand, coarse Bank Sand, Fine Gravel or the like. It is preferred to utilize silica sand since it is essentially inert, is a good transmitter for water and is inexpensive. Generally, the sand particles have an average particle size of between about 0.1 mm and about 0.01 mm usually between about 0.1 mm and about 0.05 mm.

The water-transmitting layer having a plastic sheet covering its entire surface is placed on a suitable support so as to maintain the integrity of the thickness of the water-transmitting layer as desired. If the support for the water-transmitting layer is itself water-impermeable, the bottom plastic sheet need not be utilized since its only function is to prevent evaporation of water from the water-transmitting layer. Alternatively, if the support is water-permeable such as would be the case with a cellulose product or with a wood support, the water-impermeable plastic layer is placed upon the support prior to spreading the water-transmitting layer to the desired thickness. In any event, the top plastic sheet is utilized in all cases to prevent undesirable water evaporation. At least one conduit connected to a source of water which may or may not contain plant nutrients is positioned within the layer of water-transmitting particles and appropriate means for delivering water through the conduit into the particles is provided. Containers having prongs extending from the bottom thereof then are positioned onto the top plastic sheet in a manner such that the prongs pierce the plastic sheet and extend into the layer of water-transmitting particles in such a manner that the prongs are filled with soil and/or the water-transmitting particles, thereby permitting water to pass into the soil by capillary action.

Referring to the figures, a tray support 10 is utilized to house and confine the layer of water-transmitting particles utilized in the present invention. The layer of water-transmitting particles 12 is sandwiched between a top water-impermeable plastic opaque sheet 14 and a bottom water-impermeable sheet 16. The thickness of layer 12 is such as to prevent the prongs 18 from container 20 or the prongs 22 from container 24 from piercing the bottom plastic sheet 16. In addition, the layer 12 is sufficiently thin so that only a minimum quantity of water is required to wet the layer for water-transmission into the soil 26 of container 20 or the soil 28 of container 24. Generally, layer 12 is between about ½ inch and about 3 inches thick, usually between about 0.5" and about 1.0" inches thick. The prongs in the soil containers 20 and 24 can be of any general shape. However, it is preferred that they have a tapered geometry, larger at the top of the prongs adjacent the container and smaller at the bottoms of the prongs so that the containers 20 and 24 can be stored in a nesting relationship. The prongs also can be provided with holes 23 which extend along their height in order to promote filling of the prongs with the water-transmitting particles thereby assuring a water-transmitting path from the water source to the plant 25. Since the only holes in the top sheet 14 are formed by the prongs 18 or 22 and the holes are covered by the containers 20 and 24, the water-transmitting layer 12 is not exposed to light, thereby preventing algae growth and water cannot evaporate from the water-transmitting layer 12 but must pass therefrom into the soil 26 or 28. While the figures show containers having 3 prongs, it is to be understood that any number of prongs can be used so long as a sufficiently large water path to the plant is provided.

Water is supplied to the water-transmitting layer 12 by means of conduit 34 connected to a water supply (not shown). A conventional filter 36 can be included as well as a solenoid 38 connection to a conventional automatic timer adapted to control time and rate of water delivery. A manual control valve 40 is provided to permit override of the automatically controlled solenoid valve 40. Water is delivered to header 42 and thence to pipes 43, 46 and 48 which are positioned within layer 12. If desired, a plurality of tray supports 10 or the like adapted to retain the water-transmitting layer can be positioned to the support shown and can be supplied with water from header 42. If the material utilized to form the tray 10 is water-impermeable, the lower plastic sheet 16 need not be utilized.

The following examples illustrate the present invention and are not intended to limit the same.

EXAMPLE I

This example illustrates the operation of the present invention.

A plant growing system was prepared of the dimension of 30 ft. × 200 ft. The bottom surface was lined with a continuous film of black polyethylene, 1.5 mil thick. Water was supplied through twin walled tubes spaced at four foot intervals and lying on the surface of the sand. Nutrients were supplied by incorporating a slow release fertilizer in the container mix (Osmocote 14-14-14). A sheet of black polyethylene film 1.5 mil of the dimensions of 30 ft.×200 ft. covered the entire surface of the test area.

Containers were provided with three prongs extending from the bottom thereof to provide generally circulation openings having the following diameters.

1 gallon container (6" diameter)
   3 feet ¾" each in diameter
2 gallon container (8" diameter)
   3 feet 1" each in diameter
3 gallon container (10" diameter)
   3 feet 1¼" each in diameter All feet were 1" in length. Containers were placed on top layer of polyethylene so as to force the prongs through the cover and into the sand. The sand filled the prongs thereby providing capillary communication between the sand and the container medium. The plants in the container were azaleas and rhododendrons of various cultivars.

Over a period of 4 months water was delivered at the rate of 2300 gallons/week as compared to conventional overhead irrigation that required 5,000 gallons/week. Less than one half the water was required to provide equal or superior plant growth. In addition, there was no run off in the capillary system. There was no algae observed in the covered system nor any evidence of root rot diseases after four months.

We claim:

1. A plant growing system which comprises:
   a. a layer of inert water-transmitting particles,
   b. said layer of particles being supported on a water-impermeable support,
   c. a sheet of opaque, water-impermeable plastic positioned to cover the top surface of said layer of particles,
   d. means for delivering water into said layer of particles, and
   e. at least one container housing a plant having at least one hollow prong extending from the bottom of said container, said prong having a length to permit extension into said layer of particles without contacting the water-impermeable support.

2. The system of claim 1 wherein the prongs of said container are tapered to permit storage of said containers in a nesting relationship.

3. The system of claim 1 wherein the water-impermeable support is a plastic sheet.

4. The system of claim 1 wherein the wall of each prong is provided with holes along the length of the wall.

5. The system of claim 2 wherein the wall of each prong is provided with holes along the length of the wall.

6. The system of claim 1 wherein a hydrophilic inert material is positioned within the lower portion of each container below a layer of soil in said container.

7. A container for plants useful in a system for growing plants including side walls, an open top and a bottom, at least one hollow prong extending from said bottom having a length between about ½ inch and 2 inches, and each of said prongs having a sharp exposed edge at an end most remote from said bottom, said edge adapted to facilitate piercing a plastic sheet by said prongs.

8. The container of claim 7 having a plurality of prongs.

9. The container of claim 8 wherein each prong is tapered to have a largest cross-sectional area adjacent said bottom and a smallest cross-sectional area at the end thereof most remote from said container bottom.

10. The container of claim 7 wherein each prong is tapered to have a largest cross-sectional area adjacent said bottom and a smallest cross-sectional area at the end thereof most remote from said container bottom.

* * * * *